US011061710B2

(12) United States Patent
Tsirkin

(10) Patent No.: US 11,061,710 B2
(45) Date of Patent: Jul. 13, 2021

(54) VIRTUAL MACHINE EXIT SUPPORT BY A VIRTUAL MACHINE FUNCTION

(71) Applicant: Red Hat, Inc., Raleigh, NC (US)

(72) Inventor: Michael Tsirkin, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 90 days.

(21) Appl. No.: 16/459,213

(22) Filed: Jul. 1, 2019

(65) Prior Publication Data
US 2019/0324789 A1 Oct. 24, 2019

Related U.S. Application Data

(63) Continuation of application No. 15/446,644, filed on Mar. 1, 2017, now Pat. No. 10,338,951.

(51) Int. Cl.
G06F 9/455 (2018.01)
G06F 21/53 (2013.01)

(52) U.S. Cl.
CPC .......... *G06F 9/45558* (2013.01); *G06F 21/53* (2013.01); *G06F 2009/45587* (2013.01)

(58) Field of Classification Search
None
See application file for complete search history.

(56) References Cited

U.S. PATENT DOCUMENTS

| 8,738,932 B2 | 5/2014 | Lee et al. |
| 8,868,925 B2 | 10/2014 | Wyatt et al. |
| 9,459,907 B2 | 10/2016 | Tsirkin |
| 2014/0137180 A1* | 5/2014 | Lukacs ................... G06F 21/53 726/1 |
| 2016/0171250 A1 | 6/2016 | Bovie et al. |

FOREIGN PATENT DOCUMENTS

WO WO2015178987 A2 11/2015

OTHER PUBLICATIONS

Yubin Xia, Yutao Liu, Haibo Chen, *Architecture Support for Guest-Transparent VM Protection from Untrusted Hypervisor and Physical Attacks*, 2013, Institute of Parallel and Distributed Systems, Shanghai Jiao Tong University, http://ipads.se.sjtu.edu.cn/lib/exe/fetch.php?media=publications:hypercoffer-hpca2013.pdf.

(Continued)

*Primary Examiner* — Gregory A Kessler
(74) *Attorney, Agent, or Firm* — Haynes and Boone, LLP

(57) ABSTRACT

Systems, methods, and techniques for securing a state of a guest are provided. An example method includes determining, by a virtual machine function within a guest, a guest central processing unit (CPU) state that is stored in one or more registers of a CPU and associated with the guest. The method also includes encrypting, by the virtual machine function, a first portion of the guest CPU state that is not used to execute a privileged instruction being attempted by the guest. The method further includes sending, by the virtual machine function, one or more requests based on the privileged instruction to a hypervisor. The method also includes after execution of the privileged instruction is completed, decrypting, by the virtual machine function, the first portion of the guest CPU state.

20 Claims, 5 Drawing Sheets

(56) References Cited

OTHER PUBLICATIONS

Felicitas Hetzelt, Robert Buhren, *Security Analysis of Encrypted Virtual Machines*, Dec. 6, 2016, Technical University of Berlin, Berlin, Germany https://arxiv.org/pdf/1612.01119.pdf.

Adam Belay, Andrea Bittau, Ali Mashtizadeh, David Terei, David Mazières, Christos Kozyrakis, *Dune: Safe User-level Access to Privileged CPU Features*, Oct. 8-10, 2012, Stanford University, https://www.google.co.in/url?sa=t&rct=j&q=&esrc=s&source=web&cd=4&cad=rja&uact=8&ved=0ahUKEwj3jcCe27fRAhXDto8K-HXXNCsgQFggqMAM&url=http%3A%2F%2Fwww.scs.stanford.edu%2F~dm%2Fhome%2Fpapers%2Fbelay%3Adune.pdf&usg=AFQjCNE1mTx-0jA6H2qBd8lHgosQULRZDA&bvm=bv.143423383,d.c2l.

David Kaplan, Jeremy Powell, Tom Woller, *AMD Memory Encryption*, Apr. 21, 2016, http://amd-dev.wpengine.netdna-cdn.com/wordpress/media/2013/12/AMD_Memory_Encryption_Whitepaper_v7-Public.pdf.

* cited by examiner

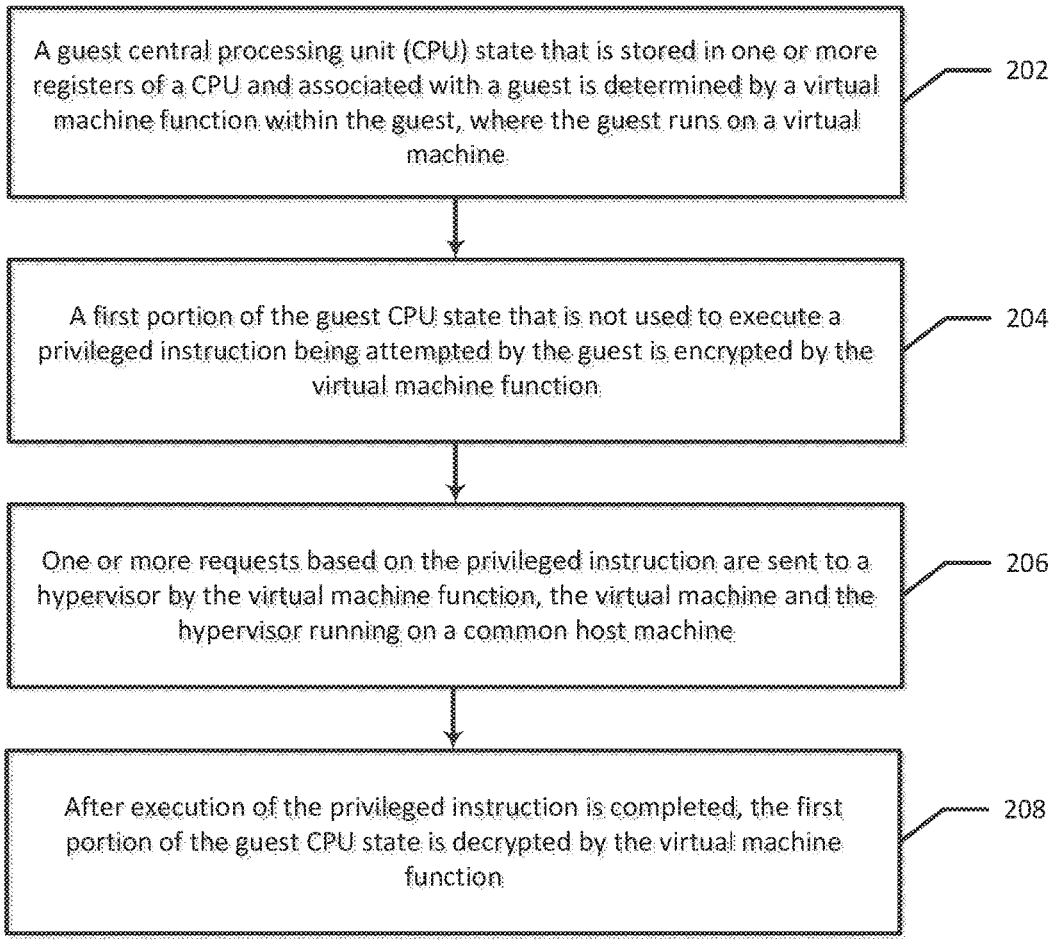

200

A guest central processing unit (CPU) state that is stored in one or more registers of a CPU and associated with a guest is determined by a virtual machine function within the guest, where the guest runs on a virtual machine — 202

A first portion of the guest CPU state that is not used to execute a privileged instruction being attempted by the guest is encrypted by the virtual machine function — 204

One or more requests based on the privileged instruction are sent to a hypervisor by the virtual machine function, the virtual machine and the hypervisor running on a common host machine — 206

After execution of the privileged instruction is completed, the first portion of the guest CPU state is decrypted by the virtual machine function — 208

*FIG. 2*

VIRTUAL MACHINE EXIT SUPPORT BY A VIRTUAL MACHINE FUNCTION

CROSS REFERENCE TO RELATED APPLICATION

The present application is a continuation of U.S. patent application Ser. No. 15/446,644, filed on Mar. 1, 2017, which is hereby incorporated by reference in its entirety.

BACKGROUND

The present disclosure generally relates to computing devices, and more particularly to protecting a state of a guest from view by a hypervisor.

A virtual machine is software that is executed on hardware to create a virtualization of a physical computer system. Virtual machines may function as self-contained platforms that run their own operating systems and software applications. A host machine, such as a server computer may concurrently run one or more virtual machines using a hypervisor. The hypervisor allocates a certain amount of the host's resources, such as the host's underlying physical processors and memory devices, to each of the virtual machines, allowing the virtual machines to transparently access the host's resources. Each virtual machine may use the allocated resources to execute applications, including operating systems referred to as guest operating systems. Each guest operating system may be accessed by one or more local or remote clients to perform computing tasks.

BRIEF SUMMARY

Methods, systems, and techniques for securing a state of a guest are provided.

An example method of securing a state of a guest includes determining, by a virtual machine function within a guest running on a virtual machine, a guest central processing unit (CPU) state that is stored in one or more registers of a CPU and associated with the guest. The method also includes encrypting, by the virtual machine function, a first portion of the guest CPU state that is not used to execute a privileged instruction being attempted by the guest. The method further includes sending, by the virtual machine function, one or more requests based on the privileged instruction to a hypervisor. The virtual machine and the hypervisor run on a common host machine. The method also includes after execution of the privileged instruction is completed, decrypting, by the virtual machine function, the first portion of the guest CPU state.

An example system for securing a state of a guest includes a hypervisor that manages resources of one or more guests and processes one or more requests from one or more guests. The system also includes a guest running on a virtual machine and including a virtual machine function. The virtual machine and the hypervisor run on a common host machine. The virtual machine function determines a guest CPU state stored in one or more registers of a CPU and associated with the guest, encrypts a first portion of the guest CPU state that is not used to execute a privileged instruction being attempted by the guest, and sends one or more requests based on the privileged instruction to a hypervisor. After execution of the privileged instruction is completed, the virtual machine function decrypts the first portion of the guest CPU state.

An example machine-readable medium includes a plurality of machine-readable instructions that when executed by one or more processors are adapted to cause the one or more processors to perform a method including: determining, by a virtual machine function within a guest running on a virtual machine, a guest CPU state that is stored in one or more registers of a CPU and associated with the guest; encrypting, by the virtual machine function, a first portion of the guest CPU state that is not used to execute a privileged instruction being attempted by the guest; sending, by the virtual machine function, one or more requests based on the privileged instruction to a hypervisor, the virtual machine and the hypervisor running on a common host machine; and after execution of the privileged instruction is completed, decrypting, by the virtual machine function, the first portion of the guest CPU state.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

FIG. 2 is an example flowchart illustrating a method of securing a guest CPU state in accordance with one or more aspects of the present disclosure.

DETAILED DESCRIPTION

Figure 1:
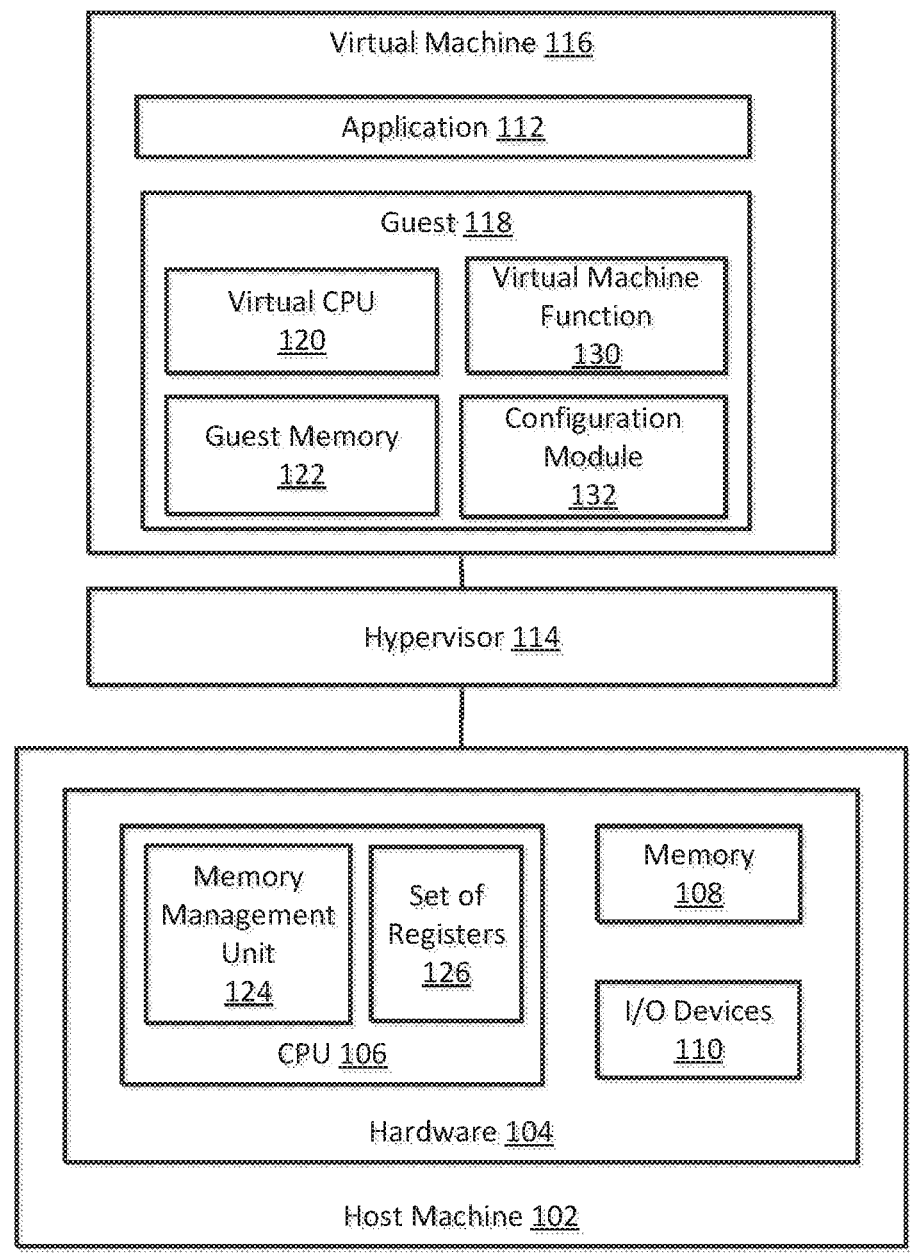
FIG. 1 is an example diagram showing an illustrative host system for handling of a virtual machine exit by a module within the guest in accordance with one or more aspects of the present disclosure.

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A virtual machine is a platform on which an operating system referred to as a guest operating system runs. In the present disclosure, a guest operating system may also be referred to as a "guest." A guest may execute an application that uses resources of a host machine. The application may execute non-privileged guest instructions and make system calls to the guest. The application is prohibited from executing privileged instructions and accessing privileged resources. The guest, however, may execute both privileged and non-privileged instructions and may access privileged resources of the virtual machine. The guest may handle system calls and exceptions from the application and interrupts from virtual input/output (I/O) devices. Because the guest lies in the physical user mode, the guest cannot execute privileged instructions of the host processor. The CPU may be aware of which instructions are privileged instructions. Such instruction executions cause exceptions and are trapped to the host operating system for exception service (e.g., termination of the executing process). The hypervisor may execute the privileged instruction on the guest's behalf.

The central processing unit (CPU) may be in one of a plurality of modes and may be switched from one mode to another mode. In an example, the plurality of CPU modes includes a hypervisor mode and a virtual mode. While the CPU is in the hypervisor mode, the hypervisor has control of the CPU, and while the CPU is in the virtual mode, the guest has control of the CPU. In response to detecting an attempt by the guest to execute a privileged instruction, the CPU may transfer control of the CPU from the guest to the hypervisor. Accordingly, a privileged instruction may cause a virtual machine exit. A virtual machine exit may cause control to be transferred from the guest to the hypervisor, and marks the point at which a transition is made between the virtual machine currently running and the hypervisor. In contrast, a virtual machine entry may cause control to be transferred from the hypervisor to the guest, and marks the point at which a transition is made between the hypervisor and the virtual machine.

A state of the guest includes guest memory state and guest CPU state. Guest memory state may refer to the state of the guest stored in the guest memory allocated to the guest. Guest CPU state may refer to the state of the guest stored in one or more registers of the CPU. The terms "guest CPU state" and "CPU state" may be used interchangeably in the present disclosure. While the CPU is in the virtual mode, the guest may execute instructions and modify the guest state. In an example, the guest may insert data into and/or delete data from guest memory and/or one or more CPU registers. As discussed, if the CPU detects an attempt by the guest to execute a privileged instruction, the CPU may transfer control to the hypervisor, at which point the hypervisor may view the guest's state. For example, while the CPU is in the hypervisor mode, the hypervisor has access to the guest state, which may potentially leak some of the guest's information to the hypervisor. A hypervisor is typically omniscient in that it can inspect all aspects of the guest. It may be desirable to allow guests of virtual machines a measure of privacy from the hypervisor.

A solution to the problem of the hypervisor being able to inspect all aspects of the guest may include encrypting all memory at all times. Unfortunately, this approach of memory encryption may also break emulation by the hypervisor if the CPU state is encrypted. Accordingly, it may be difficult to hide this portion of the guest state from the hypervisor because the hypervisor typically accesses CPU registers in order to execute instructions on behalf of the guest. Accordingly, encryption of the CPU state may be difficult because it may break CPU emulation used by the virtualization infrastructure.

A solution to the problem of breakage based on CPU state encryption may include only encrypting the guest memory and not the CPU state. Unfortunately, the problem of guest state leakage may still exist because some CPU state may still leak to the hypervisor. It is desirable to minimize the guest memory state and the guest CPU state that is visible to the hypervisor.

A solution to the problem of the hypervisor being able to inspect all aspects of the guest while avoiding the breakage problem discussed above may include providing a module within the guest for handling the virtual machine exit. In an example, the module is a virtual machine function, which may be used to improve performance and security for virtual systems. The virtual machine function may be considered a "special mode" in which the guest executes. For example, the virtual machine may be switched to a different and more privileged mode when the virtual machine function has control. As discussed in more detail below, the virtual machine function performs actions to secure the guest state before the exit to the hypervisor such that when the hypervisor has control, the hypervisor sees the minimum amount of guest state for safe execution of the privileged instruction.

In some examples, the guest includes a virtual machine function that determines a state of the guest. The guest state includes a guest CPU state that is stored in one or more registers of a CPU and associated with the guest and a guest memory state that is stored in guest memory allocated to the guest. The virtual machine function may encrypt a first portion of the guest CPU state that is not used to execute a privileged instruction being attempted by the guest and send one or more requests based on the privileged instruction to the hypervisor. After execution of the privileged instruction is completed, the virtual machine function decrypts the first portion of the guest CPU state.

In an example, the guest or the hypervisor configures the CPU to transfer control to a virtual machine function within the guest upon detecting an attempt by the guest to execute a privileged instruction. Accordingly, rather than transfer control of the CPU from the guest to the hypervisor, control of the CPU may be transferred to a virtual machine function within the guest. While the virtual machine function has control, the virtual machine function may identify the privileged instruction and determine those portions of the guest state that is or is not used by the hypervisor for safe execution of the privileged instruction. The virtual machine function may secure the guest state by encrypting a first portion of the guest CPU state that is not used by the hypervisor for safe execution of the privileged instruction, thus rendering this portion not readable by the hypervisor. Because the first portion is unnecessary for execution of the privileged instruction by the hypervisor, the first portion may be "hidden" from the hypervisor.

The use of the virtual machine function without modification of the guest may include a virtual machine function that "sits" between the guest and hypervisor. After the virtual machine function secures the appropriate guest data (e.g., by encrypting the guest state that is not needed by the hypervisor to execute the privileged instruction), the virtual machine function may trigger an exit to the hypervisor and send one or more requests to the hypervisor in accordance with execution of the privileged instruction. While the hypervisor has control, it may be unable to read any portions of the guest state unnecessary for the safe execution of the privileged instruction. The hypervisor may then execute the privileged instruction on behalf of the guest by processing the one or more requests received from the virtual machine function, and trigger a transfer of control of the CPU back to the virtual machine function. Upon re-entry, the virtual machine function may decrypt portions of the guest CPU state and restore them to a set of CPU registers.

The present disclosure provides techniques for securing a state of the guest. Unless specifically stated otherwise, as apparent from the following discussion, it is appreciated that throughout the description, discussions utilizing terms such as "determining," "storing," "detecting," "receiving," "sending," "configuring," "executing," "reading," "modifying," "moving," "encrypting," "decrypting," "providing," "triggering," "restoring," and "overwriting," "configuring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is an example diagram showing an illustrative host system 100 for handling of a virtual machine exit by a module within the guest in accordance with one or more aspects of the present disclosure. According to the present example, a physical system, such as a host machine 102 includes hardware 104 such as a CPU 106 for executing software (e.g., machine-readable instructions) and using or updating data stored in a memory 108. Hardware 104 may include more than one CPU 106. A "CPU" may also be referred to as a "processor" or "physical processor" herein. A CPU shall refer to a device capable of executing instructions encoding arithmetic, logical, or input/output (I/O) operations. In an example, a CPU may follow the Von Neumann architectural model and may include an arithmetic logic unit (ALU), a control unit, and a set of registers 126. In a further aspect, a CPU may be a single-core CPU that is typically capable of executing one instruction at a time (or processing a single pipeline of instructions), or a multi-core CPU that may simultaneously execute multiple instructions. In another aspect, a CPU may be implemented as a single-integrated circuit, two or more integrated circuits, or may be a component of a multi-chip module (e.g., in which individual microprocessor dies are included in a single integrated circuit package and hence share a single socket).

Memory 108 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may also be referred to as "working memory." The various types of memory may store information in the form of software and data. The software may include an operating system, a hypervisor, and various other software applications. Hardware 104 may also include other I/O devices 110.

Host machine 102 may be coupled over a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

Host machine 102 may run one or more virtual machines 116 that run applications 112 and services. A hypervisor 114 manages resources of host machine 102 and makes them available to one or more guests that may be alternately or concurrently executed by host machine 102. Hypervisor 114 may manage hardware resources and arbitrate requests of the multiple guests. For example, hypervisor 114 may present a virtual set of CPUs, memory, I/O, and disk resources to each guest based on the physical hardware and/or based on a standard and consistent selection of custom hardware. A virtual machine is provided its own address space in memory, its own CPU resource allocation, and its own device I/O using its own virtual devices. A guest may be a different operating system than the operating system running on host machine 102. In the example illustrated in FIG. 1, hypervisor 114 supports virtual machine 116 having a virtual CPU 120 and guest memory 122. Although one virtual machine is illustrated, host system 100 may include two or more virtual machines.

The hardware resources of host machine 102 are shared among hypervisor 114 and one or more guests. Hypervisor 114 may map a virtual resource or state (e.g., registers, memory, or files) to resources in the underlying host machine 102. Application 112 may have one or more processes executing on host machine 102. A guest 118 may use a memory management technique called virtual memory, which maps virtual addresses used by an application into physical addresses in memory 108. CPU 106 includes a memory management unit (MMU) 124 that supports the use of virtual memory. With MMU 124, memory addresses may go through a translation step from a virtual address to a physical address prior to each memory access. In a virtual memory system, the addresses seen by user programs do not directly correspond to the physical addresses used by the hardware.

Hypervisor 114 presents guest memory 122 to virtual machine 116 and maps guest physical memory addresses of guest memory 122 to host physical memory addresses of memory 108 using page tables. Host physical memory refers to the memory that is visible by hypervisor 114 as available on the system. Guest physical memory refers to the memory that is visible to the guest running in the virtual machine and is backed by host physical memory. Hypervisor 114 may sit between the guest physical memory and MMU 124 on CPU 106. Memory 108 may include random access memory (RAM), and MMU 124 may divide the RAM into pages. A page is a contiguous section of memory of a set size that is handled by MMU 124 as a single entity. Guest virtual memory refers to a continuous virtual address space presented by the guest to one or more applications. The guest may present a virtual address space to the applications running on the guest. Guest virtual memory is visible to the applications running inside the virtual machine. Virtual memory addresses may be mapped to physical memory addresses using one or more data structures (e.g., a page table).

CPU 106 includes a set of registers 126. A register provides a fast mechanism for CPU 106 to access data. One or more registers of set of registers 126 may be, for example, a data register that stores a numeric value (e.g., integer), address register that stores memory addresses that are used by instructions that indirectly access working memory, a general-purpose register that can store both data and memory addresses, floating-point register that stores a floating point number, constant register that stores a read-only value, vector register that stores data for vector processing done by Single Instruction, Multiple Data (SIMD), or special-purpose register that stores program state.

While guest 118 has control of CPU 106, the guest may modify the data stored in guest memory 122 and/or set of registers 126. As discussed, control of CPU 106 may be transferred to a module within guest 118 to secure the guest state, which may include a guest memory state stored in guest memory 122 allocated to guest 118 and the guest CPU state. The module within guest 118 may be a virtual machine function 130, which may be special code that is run within guest 118 and performs actions to protect at least some portions of the guest CPU state from being viewed by hypervisor 114. It should be understood that the virtual machine function code may run with or without supervisor privileges within guest 118.

Guest 118 includes a configuration module 132 that configures CPU 106 to transfer control to virtual machine function 130 upon detecting an attempt by guest 118 to execute a privileged instruction. CPU 106 may detect an attempt by guest 118 to execute a privileged instruction. In an example, CPU 106 has a list of which instructions are privileged instructions and recognizes the attempted instruction as being a privileged instruction that is included in the list. A privileged instruction may be, for example, an I/O access request related to network or connectivity activity by the guest.

In the example illustrated in FIG. 1, guest 118 includes configuration module 132. It should also be understood that in other examples, configuration module 132 may be included in hypervisor 114. If configuration module 132 is included in hypervisor 114, guest 118 may confirm whether CPU 106 has been configured to transfer control to virtual machine function 130 upon detecting the attempt by guest 118 to execute the privileged instruction. Guest 118 may request this confirmation because hypervisor 114 may be malicious and desire to view the guest's state. In response to a determination that CPU 106 has not been configured to transfer control to virtual machine function 130 upon detecting the attempt by guest 118 to execute the privileged instruction, guest 118 configures CPU 106 to transfer control to the virtual machine function 130 upon detecting the attempt by guest 118 to execute the privileged instruction.

While virtual machine function 130 has control of CPU 106, virtual machine function 130 may determine the privileged instruction attempted by guest 118 that caused the virtual machine exit and perform actions to secure the guest state and in particular the guest CPU state. In some examples, CPU 106 makes the privileged instruction available to virtual machine function 130 by storing the privileged instruction in a particular memory accessible by virtual machine function 130. In an example, the privileged instruction or address of the privileged instruction is stored in a memory (e.g., a guest memory address or a register of set of registers 126), and virtual machine function 130 identifies the privileged instruction by reading the privileged instruction or its address from the memory. Virtual machine function 130 may detect the address of the privileged instruction and access the address accordingly to obtain more information about the privileged instruction. Because virtual machine function 130 is within guest 118, virtual machine function 130 has access to the memory (e.g., encrypted or decrypted) viewable by guest 118. Accordingly, virtual machine function 130 may read that memory and be able to identify the privileged instruction.

Configuration module 132 may configure CPU 106 to transfer control to virtual machine function 130 in a variety of ways. In some examples, CPU 106 exposes a first set of commands that when invoked, configures CPU 106 to transfer control to virtual machine function 130 upon detecting an attempt by guest 118 to execute a privileged instruction. CPU 106 may also expose a second set of commands that when invoked, configures CPU 106 to transfer control to hypervisor 114 upon detecting an attempt by guest 118 to execute a privileged instruction. Configuration module 132 may invoke the first set of commands and/or the second set of commands for configuration of CPU 106 accordingly.

In some examples, CPU 106 maintains a transfer state. If the transfer state is a first value, CPU 106 is configured to transfer control to hypervisor 114 upon detecting an attempt by guest 118 to execute a privileged instruction. If the transfer state is a second value, CPU 106 is configured to transfer control to virtual machine function 130 upon detecting an attempt by guest 118 to execute a privileged instruction. Configuration module 132 may modify the transfer state value for configuration of CPU 106 accordingly.

In some examples, CPU 106 includes a register of set of registers 126 that stores a memory address of where to jump to upon detecting an attempt by guest 118 to execute a privileged instruction. Configuration module 132 may change this address to cause control of CPU 106 to transfer to hypervisor 114 or virtual machine function 130 upon detecting an attempt by guest 118 to execute a privileged instruction.

In some examples, virtual machine function 130 determines a first portion of the guest CPU state that is not used by hypervisor 114 to execute the privileged instruction and a second portion of the guest CPU state that is used by hypervisor 114 to execute the privileged instruction. It is unnecessary for hypervisor 114 to view the first portion of the guest CPU state because it is not used by hypervisor 114 for execution of the privileged instruction. Accordingly, virtual machine function 130 may secure the guest CPU state by encrypting the first portion of the guest CPU state. Encryption of the first portion "hides" this guest CPU state from hypervisor 114 upon a virtual machine exit to hypervisor 114. In some examples, the first portion is stored in a first set of CPU registers, and virtual machine function 130 encrypts the first portion by moving it into an encrypted memory. Virtual machine function 130 moves the first portion into the encrypted memory by storing it into the encrypted memory and deleting the first portion from the first set of CPU registers. In an example, virtual machine function 130 overwrites the first set of CPU registers so that hypervisor 114 is unable to view the first portion of the guest CPU state that was initially stored in the registers.

Additionally, virtual machine function 130 may ensure that the second portion of the guest CPU state is accessible by hypervisor 114 because the second portion is used by the hypervisor to execute the privileged instruction. After virtual machine function 130 secures the guest CPU state, virtual machine function 130 may trigger the exit to hypervisor 114. While hypervisor 114 has control of CPU 106, hypervisor 114 executes the privileged instruction on behalf of guest 118, and is unable to view those portions of the guest CPU state that are not used for execution of the privileged instruction.

Virtual machine function 130 analyzes the privileged instruction and the guest CPU state, and secures the guest CPU state by performing one or more actions to prevent unnecessary exposure of the guest CPU state to hypervisor 114. FIG. 2 is an example flowchart illustrating a method 200 of securing the guest CPU state in accordance with one or more aspects of the present disclosure. Method 200 is not meant to be limiting and may be used in other applications. Method 200 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 200 is performed by the system 100 illustrated in FIG. 1. For example, method 200 may be performed on host machine 102. In some examples, the order of the actions described below may also be performed according to alternative orderings. In yet other examples, additional actions may be added and actions that are described may be removed.

Method 200 includes blocks 202, 204, 206, and 208. In block 202, a guest CPU state that is stored in one or more registers of CPU 106 and associated with guest 118 is determined by virtual machine function 130 within the guest, where the guest runs on virtual machine 116. Virtual machine function 130 may access the guest CPU state by reading it from one or more registers of set of registers 126.

In block 204, a first portion of the guest CPU state that is not used to execute a privileged instruction being attempted by guest 118 is encrypted by virtual machine function 130. The guest CPU state may also include a second portion that is used to execute the privileged instruction. It may be desirable for virtual machine function 130 to secure the guest state by encrypting the first portion, which is not used by hypervisor 114 for execution of the privileged instruction, but to ensure that the second portion is accessible by hypervisor 114.

After virtual machine function 130 encrypts the first portion of the guest CPU state so that it is not accessible by hypervisor 114, virtual machine function 130 triggers an exit to hypervisor 114. In block 206, one or more requests based on the privileged instruction are sent to hypervisor 114 by virtual machine function 130, where virtual machine 116 and hypervisor 114 run on a common host machine. The one or more requests may include a request to exit to virtual machine function 130. In some examples, virtual machine function 130 sends the one or more requests to hypervisor 114 by invoking a hypercall based on the privileged instruction. The hypercall may include information from the privileged instruction. In some examples, virtual machine function 130 sends the one or more requests to hypervisor 114 by forwarding the privileged instruction to hypervisor 114. While hypervisor 114 has control of CPU 106, hypervisor 114 is unable to view the encrypted portions of the guest CPU state, thus preventing the leakage of this information to hypervisor 114.

Virtual machine function 130 and/or hypervisor 114 may partially or fully execute the privileged instruction on behalf of guest 118. In some examples, virtual machine function 130 processes the privileged instruction to completion and sends a request to trigger an exit to the virtual machine function to hypervisor 114. In this example, the transfer of CPU control to hypervisor 114 may be a formality so that hypervisor 114 is informed that the privileged instruction has been completed. In an example, virtual machine function 130 determines that the cause of the exit was a write to a memory page and performs the requested write to the memory page on behalf of guest 118. In another example, virtual machine function 130 determines that the cause of the exit was an I/O port access request and which port the guest attempted to access. In this example, virtual machine function 130 may access the I/O port (e.g., a read from the I/O port) on behalf of guest 118 and make the applicable data available to guest 118 in accordance with the request.

In some examples, hypervisor 114 processes the privileged instruction to completion. In an example, virtual machine function 130 performs one or more operations for processing of the privileged instruction and requests hypervisor 114 to complete execution of the privileged instruction. Accordingly, if additional processing is to be performed by hypervisor 114, hypervisor 114 may complete execution of the privileged instruction. For example, virtual machine function 130 may process a first workload in accordance with processing of the privileged instruction. In this example, virtual machine function 130 may send to hypervisor 114 one or more requests including a first request to process a second workload in accordance with processing of the privileged instruction and a second request to trigger an exit to the virtual machine function after execution of the privileged instruction is completed. In such an example, both virtual machine function 130 and hypervisor 114 may perform actions to complete processing of the privileged instruction.

After the privileged instruction has been successfully executed (e.g., by virtual machine function 130 and/or hypervisor 114), hypervisor 114 may transfer control of CPU 106 back to virtual machine 116, which may be referred to as an entry or a re-entry of the virtual machine. In block 208, after execution of the privileged instruction is completed, the first portion of the guest CPU state is decrypted by virtual machine function 130. Virtual machine function 130 may decrypt the first portion at this point because control of CPU 106 has been transferred from hypervisor 114 to guest 118, which may view its state in its entirety without fear of leakage to hypervisor 114. In some examples, virtual machine function 130 decrypts the first portion upon virtual machine re-entry and restores the first portion of the guest CPU state to one or more CPU registers. Virtual machine function 130 may restore the guest CPU state back to its original form and provide guest 118 with information for accessing the restored guest CPU state. Encrypting and decrypting the guest state in such a manner may provide benefits because hypervisor 114 is unable to view portions of the guest CPU state unless they are used to execute the privileged instruction, thus securing the guest CPU state against unwarranted viewing by hypervisor 114.

It is understood that additional processes may be performed before, during, or after blocks 202, 204, 206 and/or 208 discussed above. For example, after virtual machine function 130 restores the guest CPU state, guest 118 may then continue to execute.

Figure 3:
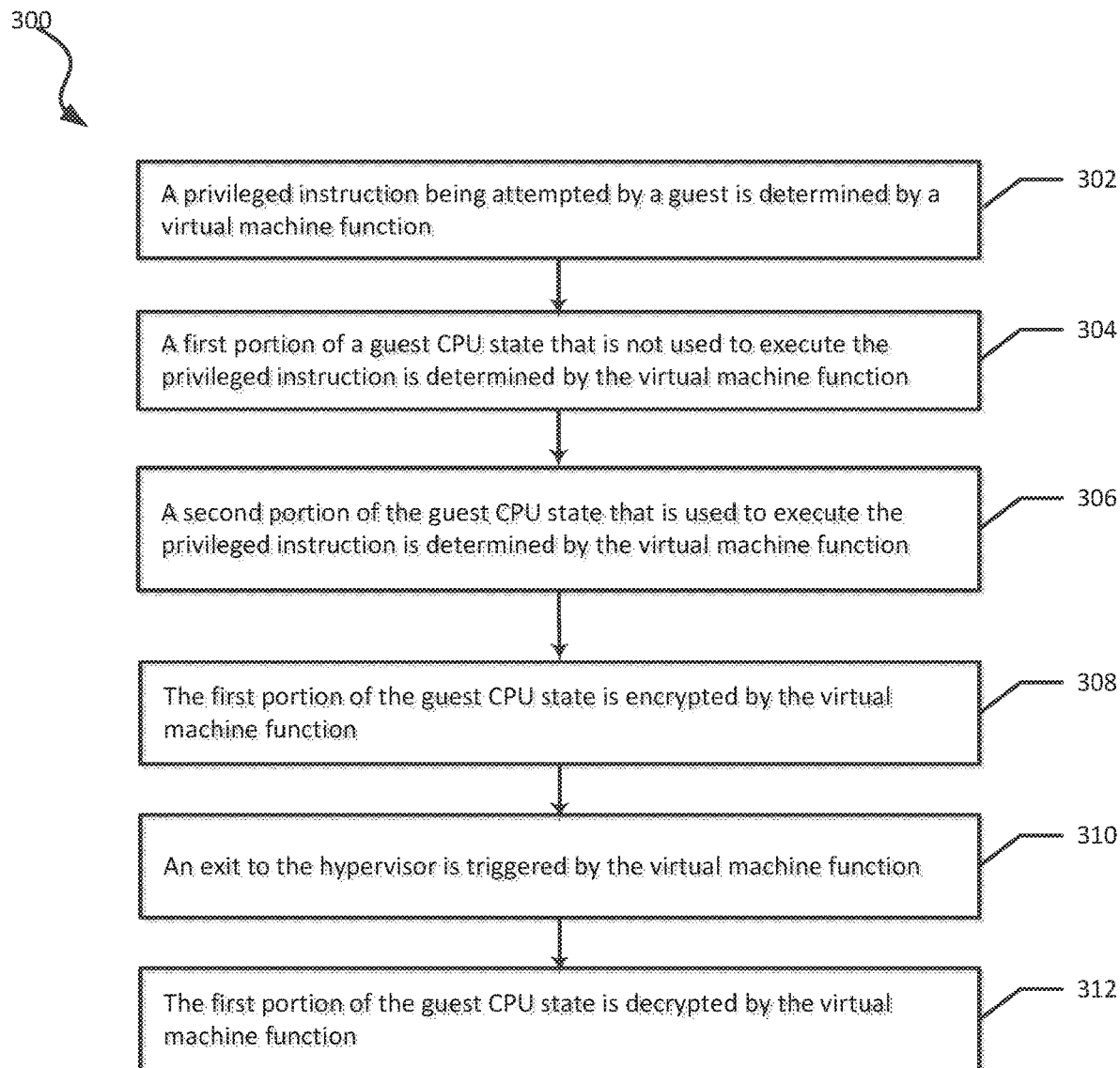
FIG. 3 is an example flowchart illustrating a method of encrypting and decrypting the guest CPU state in accordance with one or more aspects of the present disclosure.

Virtual machine function 130 may secure the guest CPU state in a variety of ways. FIG. 3 is an example flowchart illustrating a method 300 of encrypting and decrypting the guest CPU state in accordance with one or more aspects of the present disclosure. Method 300 is not meant to be limiting and may be used in other applications. Method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 300 is performed by the system 100 illustrated in FIG. 1. For example, method 300 may be performed on host machine 102. In some examples, the order of the actions described below may also be performed according to alternative orderings. In yet other examples, additional actions may be added and actions that are described may be removed.

Method 300 includes blocks 302, 304, 306, 308, 310, and/or 312. In block 302, a privileged instruction being attempted by a guest is determined by a virtual machine function. The privileged instruction or its address may be stored in guest memory 122 or set of registers 126 and accessible by virtual machine function 130. In block 304, a first portion of a guest CPU state that is not used to execute the privileged instruction is determined by the virtual machine function. In block 306, a second portion of the guest CPU state that is used to execute the privileged instruction is determined by the virtual machine function. Hypervisor 114 uses the second portion of the guest CPU state for execution of the privileged instruction and thus this state should be available to hypervisor 114.

In block 308, the first portion of the guest CPU state is encrypted by the virtual machine function. In an example, in response to determining that the first portion of the guest CPU state is not used to execute the privileged instruction, virtual machine function 130 encrypts the first portion of the guest CPU state. Encrypted data is protected from being viewed by hypervisor 114, which is unable to view the encrypted guest state. Hypervisor 114 may use at least some of the guest CPU state to successfully execute the privileged instruction. The first portion of the guest CPU state may be stored in a first set of CPU registers. In an example, virtual machine function 130 encrypts the first portion of the guest CPU state by moving it into an encrypted memory. Virtual machine function 130 may move the first portion of the guest CPU state into the encrypted memory by storing the portion into the encrypted memory and deleting the portion from the first set of CPU registers.

Accordingly, after blocks 302, 304, 306, and 308 are executed, the minimum guest CPU state is available to hypervisor 114 for safe execution of the privileged instruction. Accordingly, hypervisor 114 may execute the privileged instruction without being able to view guest CPU state that is irrelevant to processing of the privileged instruction.

In block 310, an exit to the hypervisor is triggered by virtual machine function 130. Hypervisor 114 may then process the privileged instruction. After execution of the privileged instruction has completed, hypervisor 114 may trigger an exit to virtual machine function 130, which may then restore the appropriate guest CPU state back to its original state (before virtual machine function 130 secured the guest CPU state).

In block 312, the first portion of the guest CPU state is decrypted by virtual machine function 130. In some examples, upon virtual machine re-entry, virtual machine function 130 decrypts and restores the first portion of the guest CPU state that was stored in encrypted memory to set of registers 126. Virtual machine function 130 may decrypt the first portion of the guest CPU state by moving it from the encrypted memory to a second set of registers of set of registers 126. The first set of CPU registers that initially stored the first portion of the guest CPU state may be the same as or different from the second set of CPU registers. Virtual machine function 130 may provide the decrypted portion to hypervisor 114 by, for example, storing the decrypted portion into a memory accessible by hypervisor 114. Hypervisor 114 has access to this data for safely processing the privileged instruction.

In some examples, CPU 106 includes an encryption module that encrypts data before writing it to memory and/or a decryption module that decrypts data when reading it from memory. In this example, virtual machine function 130 may encrypt data by invoking a command that causes CPU 106's encryption module to encrypt a portion or all of the guest CPU state and/or decrypt data by invoking a command that causes CPU 106's decryption module to decrypt a portion or all of the guest CPU state. Hypervisor 114 may be unable to access guest 118's information from within virtual machine 116, but virtual machine function 130 is fully able to access this information. In another example, virtual machine function 130 performs the encryption and/or decryption itself.

It is understood that additional processes may be performed before, during, or after blocks 302, 304, 306, 308, 310, and/or 312 discussed above. In an example, before triggering the exit to hypervisor 114, virtual machine function 130 overwrites one or more CPU registers of set of registers 126 that is not used by hypervisor 114 to execute the privileged instruction. In this example, the CPU registers that are overwritten are not used by hypervisor 114 for execution of the privileged instruction, and thus may be used for other storage of data while hypervisor 114 has control of CPU 106.

Figure 4:
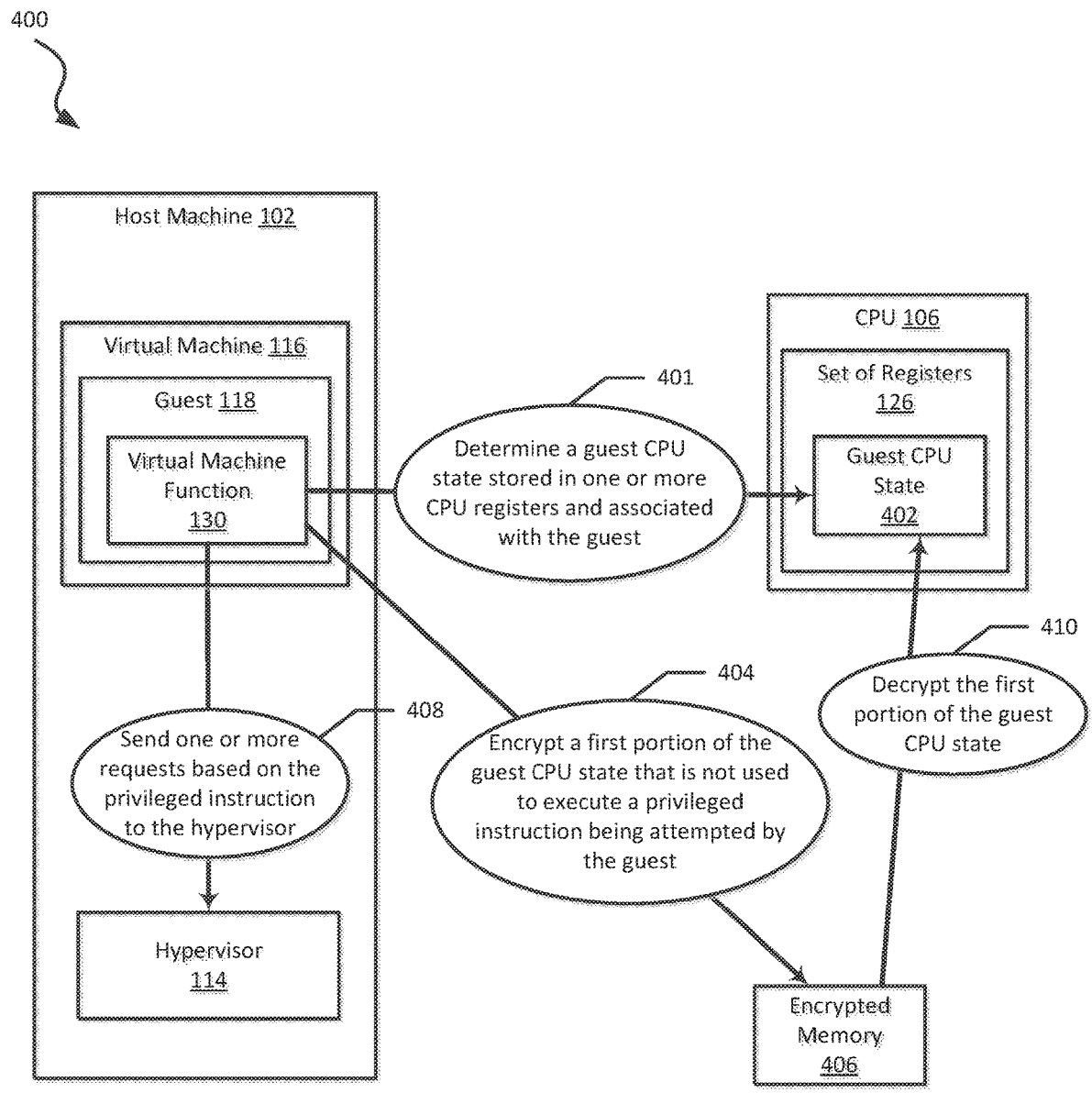
FIG. 4 is an example block diagram illustrating a system for securing the guest CPU state in accordance with one or more aspects of the present disclosure.

FIG. 4 is an example block diagram illustrating a system 400 for securing the guest CPU state in accordance with one or more aspects of the present disclosure. In FIG. 4, hypervisor 114 manages resources of one or more guests and processes one or more requests from one or more guests. Guest 118 runs on virtual machine 116, and virtual machine 116 and hypervisor 114 run on common host machine 102.

Guest 118 includes virtual machine function 130. At action 401, virtual machine function 130 determines a guest CPU state 402 stored in one or more registers of set of registers 126 and associated with guest 118. Guest CPU state 402 is a state of guest 118 that is stored on CPU 106. Guest 118 may also be associated with a guest memory state that is stored in guest memory 122. Guest CPU state 402 may include a first portion that is not used to execute the privileged instruction and a second portion that is used to execute the privileged instruction.

At action 404, virtual machine function 130 encrypts a first portion of guest CPU state 402 that is not used to execute a privileged instruction being attempted by guest 118. The first portion of guest CPU state 402 is unnecessary for hypervisor 114 to use for execution of the privileged instruction. Accordingly, it is unnecessary for hypervisor 114 to view this first portion of guest CPU state, and thus virtual machine function 130 encrypts it. In an example, virtual machine function 130 encrypts the first portion by storing it in an encrypted memory 406.

At action 408, virtual machine function 130 sends one or more requests based on the privileged instruction to hypervisor 114. In an example, the one or more requests include a request to complete the processing of the privileged instruction and/or to trigger an exit to virtual machine function 130. Virtual machine function 130 may send the one or more requests by triggering an exit to hypervisor 114. Hypervisor 114 may finish execution of the privileged instruction and trigger an exit to the virtual machine and in particular an exit to virtual machine function 130.

At action 410, after execution of the privileged instruction is completed, virtual machine function 130 decrypts the first portion of the guest CPU state. In an example, virtual machine function 130 decrypts the first portion and restores the first portion of the guest CPU state that was encrypted at action 404 back to one or more registers of set of registers 126. After restoration of the first portion of guest CPU state 402, guest 118 may view its guest state in the same format that it was in before virtual machine function 130 encrypted the first portion.

As discussed above and further emphasized here, FIGS. 1-4 are merely examples, which should not unduly limit the scope of the claims.

Figure 5:
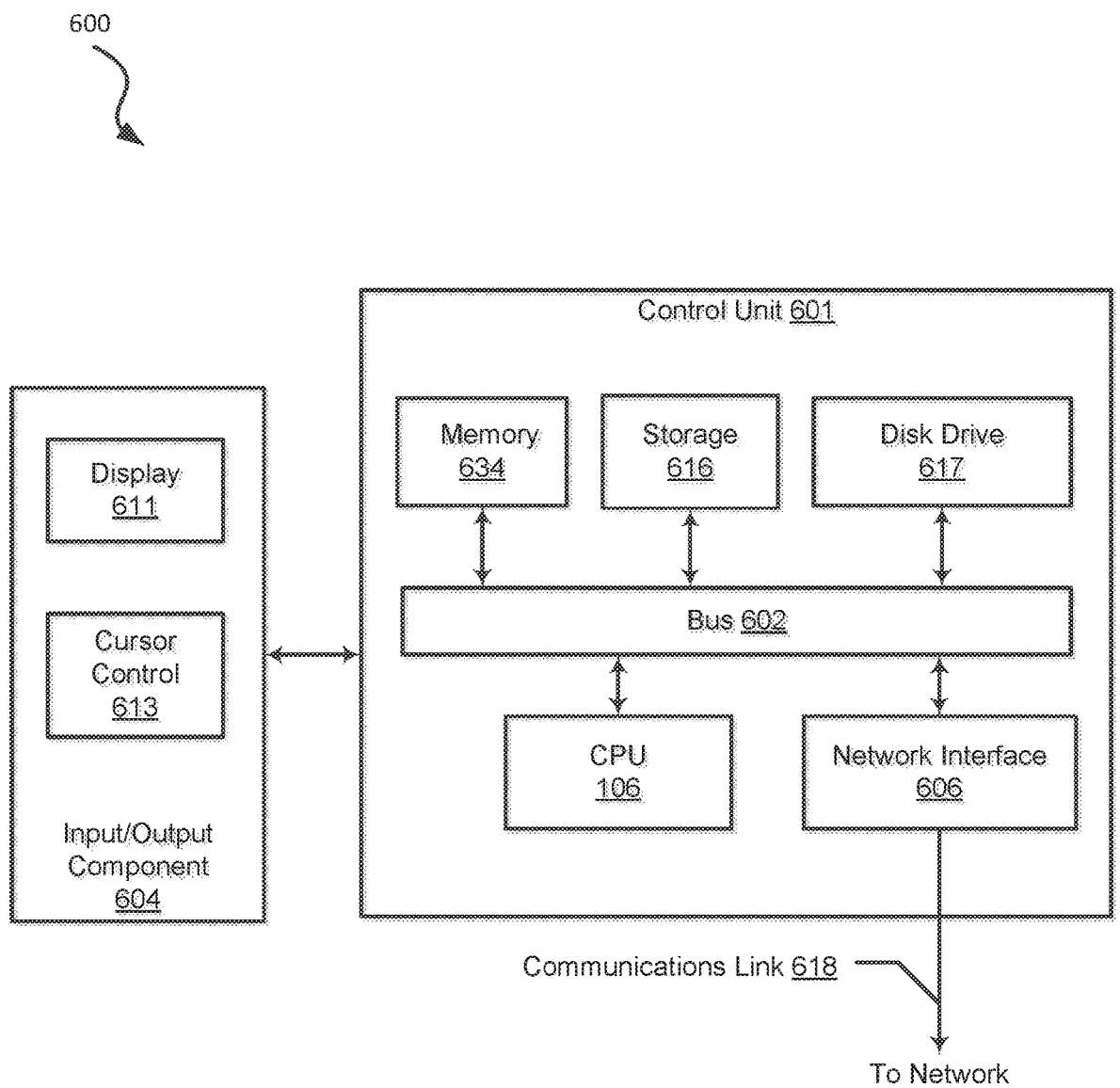
FIG. 5 is a block diagram of a computer system suitable for implementing one or more examples of the present disclosure.

FIG. 5 is a block diagram of a computer system 600 suitable for implementing one or more examples of the present disclosure. In various implementations, computer system 600 corresponds to host machine 102, which may include a client or a server computing device. The client or server computing device may include a plurality of CPUs. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a CPU or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an I/O component 604 that processes a user action, such as selecting keys from a keypad/keyboard or selecting one or more buttons or links, and sends a corresponding signal to bus 602. In an example, a user may interact with a host computing system using I/O component 604 and cause virtual machine 116 to launch. A user may cause guest 118 to attempt to execute a privileged instruction via I/O component 604. I/O component 604 may also include an output component such as a display 611, and an input control such as a cursor control 613 (such as a keyboard, keypad, or mouse).

A transceiver or network interface 606 transmits and receives signals between computer system 600 and other devices via a communications link 618 to a network. In an example, the transmission is wireless, although other transmission mediums and methods may also be suitable. CPU 106, which may be a micro-controller, digital signal processor (DSP), or other processing component, processes these various signals, such as for display on computer system 600 or transmission to other devices via communications link 618. CPU 106 may also control transmission of information, such as cookies or IP addresses, to other devices.

Components of computer system 600 also include a system memory component 634 (e.g., RAM), a static storage component 616 (e.g., ROM), and/or a disk drive 617. Computer system 600 performs specific operations by CPU 106 and other components by executing one or more sequences of instructions contained in system memory component 634. Logic may be encoded in a computer readable medium, which may refer to any medium that participates in providing instructions to CPU 106 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 200, method 300, and/or method 400) to practice the present disclosure may be performed by computer system 600. In various other examples, a plurality of computer systems 600 coupled by communication links 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks, steps, or actions described herein may be changed, combined into composite blocks, steps, or composite actions, and/or separated into sub-blocks, sub-steps, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of securing a state of a guest, comprising:
   detecting, by a virtual machine function within a guest running on a virtual machine, an attempt by the guest to execute a privileged instruction; and
   in response to detecting the attempt by the guest to execute the privileged instruction, encrypting, by the virtual machine function, a first portion of a guest central processing unit (CPU) state that is not used to execute the privileged instruction.

2. The method of claim 1, further comprising:
   determining that the first portion of the guest CPU state is not used to execute the privileged instruction.

3. The method of claim 1, wherein the guest CPU state is stored in one or more registers of a CPU, and a register of the one or more registers stores a memory address, the method further comprising:
   executing a jump operation to the memory address upon detecting the attempt by the guest to execute the privileged instruction.

4. The method of claim 1, further comprising:
   configuring a CPU to transfer control to the virtual machine function upon detecting the attempt by the guest.

5. The method of claim 1, further comprising:
performing, by the virtual machine function, one or more operations for processing the privileged instruction; and
sending, by the virtual machine function, a request to a hypervisor to complete execution of the privileged instruction, wherein the hypervisor and the virtual machine run on a common host machine.

6. The method of claim 1, wherein encrypting the first portion of the guest CPU state includes:
moving the first portion from a first set of CPU registers into an encrypted memory; and
deleting the first portion from the first set of CPU registers.

7. The method of claim 6, further comprising:
triggering an exit to a hypervisor after encrypting the first portion of the guest CPU state, wherein the hypervisor and the virtual machine run on a common host machine.

8. The method of claim 7, further comprising:
upon virtual machine re-entry, restoring the first portion of the guest CPU state from the encrypted memory to a second set of CPU registers.

9. The method of claim 8, wherein the first set of CPU registers is different from the second set of CPU registers.

10. The method of claim 8, wherein the first set of CPU registers is the same as the second set of CPU registers.

11. A system for securing a state of a guest, comprising:
a central processing unit (CPU) that detects an attempt by a guest to execute a privileged instruction, wherein the guest runs on a virtual machine; and
a virtual machine function that encrypts a first portion of a guest CPU state that is not used to execute the privileged instruction.

12. The system of claim 11, wherein the guest includes the virtual machine function.

13. The system of claim 12, wherein the virtual machine enters a first privileged mode when the virtual machine function has control and enters a second privileged mode when the guest has control, and the first privileged mode has a higher privilege level than the second privilege mode.

14. The system of claim 11, further comprising:
a configuration module that configures the CPU to transfer control to the virtual machine function within the guest upon detecting the attempt by the guest.

15. The system of claim 14, wherein the guest includes the configuration module.

16. The system of claim 15, wherein the guest determines whether the CPU has been configured to transfer control to the virtual machine function upon detecting the attempt by the guest to execute the privileged instruction, wherein in response to a determination that the CPU has not been configured to transfer control to the virtual machine function upon detecting the attempt by the guest to execute the privileged instruction, the guest configures the CPU to transfer control to the virtual machine function upon detecting the attempt by the guest.

17. The system of claim 14, wherein a hypervisor includes the configuration module, the virtual machine function has control of the CPU, and the hypervisor and the virtual machine run on a common host machine.

18. The system of claim 14, wherein a register of the CPU stores a first memory address, and the configuration module changes the first memory address to a second memory address to cause control of the CPU to transfer to the virtual machine function.

19. A non-transitory machine-readable medium comprising a plurality of machine-readable instructions that when executed by one or more processors is adapted to cause the one or more processors to perform a method comprising:
detecting, by a virtual machine function within a guest running on a virtual machine, an attempt by the guest to execute a privileged instruction; and
in response to detecting the attempt by the guest to execute the privileged instruction, encrypting, by the virtual machine function, a first portion of a guest central processing unit (CPU) state that is not used to execute the privileged instruction.

20. The machine-readable medium of claim 19, the method further comprising:
performing, by the virtual machine function, one or more operations for processing the privileged instruction; and
sending, by the virtual machine function, a request to a hypervisor to complete execution of the privileged instruction, wherein the hypervisor and the virtual machine run on a common host machine.

* * * * *